United States Patent [19]
Walter

[11] Patent Number: 5,660,768
[45] Date of Patent: Aug. 26, 1997

[54] METHOD FOR FORMING A RETROREFLECTIVE STRUCTURE

[75] Inventor: Helmut Walter, Pittsford, N.Y.

[73] Assignee: Reflexite Corporation, Avon, Conn.

[21] Appl. No.: 459,334

[22] Filed: Jun. 2, 1995

Related U.S. Application Data

[62] Division of Ser. No. 336,467, Nov. 9, 1994, Pat. No. 5,501,545.

[51] Int. Cl.$^6$ .................................................... B29D 11/00
[52] U.S. Cl. ..................... 264/1.9; 29/897; 116/63 R; 264/2.5; 425/808
[58] Field of Search ..................... 404/12, 13, 14, 404/15, 16; 359/529, 530, 531; 264/1.9, 2.5; 425/808; 29/897; 116/63 R, 63 P, 63 T

[56] References Cited

U.S. PATENT DOCUMENTS

| | | |
|---|---|---|
| 1,707,432 | 4/1929 | Erickson . |
| 2,664,065 | 12/1953 | Thompson ........................ 116/63 R |
| 2,948,191 | 8/1960 | Hodgson, Jr. et al. . |
| 2,991,698 | 7/1961 | Leubaz . |
| 3,277,800 | 10/1966 | Wiswell . |

(List continued on next page.)

FOREIGN PATENT DOCUMENTS

| | | | |
|---|---|---|---|
| 119986 | 9/1984 | European Pat. Off. ................. | 404/15 |
| 2 450 906 | 3/1979 | France . | |

OTHER PUBLICATIONS

U.S. Application Ser. No. 08/092,708, "Roadway Markers with Concave Curved Edges" by Speer et al.

"Retroreflective Raised Pavement Markers: A Two-Year Field Evaluation in Texas," Research Report 1946-3F, Texas Transportation Institute, The Texas A&M University System, College Station, Texas.

*Primary Examiner*—Mathieu D. Vargot
*Attorney, Agent, or Firm*—Hamilton, Brook, Smith & Reynolds, P.C.

[57] ABSTRACT

A retroreflective structure has a window side and a facet side. The facet side has a plurality of steps with treads and risers intersecting at an angle. The risers include an array of retroreflective elements. Preferably, the elements are cube-corner prisms. The method includes forming the structure by polymerizing a polymerizable material in a mold having a facet side including a tiered structure having a plurality of steps with treads and risers intersecting at an angle and wherein the risers include an array of retroreflective elements.

20 Claims, 5 Drawing Sheets

U.S. PATENT DOCUMENTS

| | | | |
|---|---|---|---|
| 3,319,542 | 5/1967 | Bergsnov-Hansen . | |
| 3,392,639 | 7/1968 | Heenan et al. . | |
| 3,409,344 | 11/1968 | Balint et al. | 264/1.9 |
| 3,417,959 | 12/1968 | Schultz | 249/117 |
| 3,541,216 | 11/1970 | Rochlis | 264/293 |
| 3,588,222 | 6/1971 | Julius . | |
| 3,684,348 | 8/1972 | Rowland . | |
| 3,689,346 | 9/1972 | Rowland | 156/245 |
| 3,810,804 | 5/1974 | Rowland | 156/245 |
| 3,811,983 | 5/1974 | Rowland | 156/245 |
| 3,830,682 | 8/1974 | Rowland . | |
| 3,836,226 | 9/1974 | Cechetini . | |
| 3,924,958 | 12/1975 | Rowland | 404/15 |
| 3,935,359 | 1/1976 | Rowland | 428/172 |
| 3,936,208 | 2/1976 | Baynes et al. | 404/16 |
| 3,938,903 | 2/1976 | Montgomery | 404/16 |
| 3,975,083 | 8/1976 | Rowland . | |
| 3,992,080 | 11/1976 | Rowland . | |
| 4,040,760 | 8/1977 | Wyckoff | 404/14 |
| 4,076,383 | 2/1978 | Heasley . | |
| 4,145,112 | 3/1979 | Crone et al. . | |
| 4,182,548 | 1/1980 | Searight et al. . | |
| 4,202,600 | 5/1980 | Burke et al. . | |
| 4,234,265 | 11/1980 | Otis | 404/16 |
| 4,243,618 | 1/1981 | Van Arnam . | |
| 4,244,683 | 1/1981 | Rowland | 425/143 |
| 4,279,471 | 7/1981 | Rowland . | |
| 4,332,847 | 6/1982 | Rowland | 428/156 |
| 4,362,425 | 12/1982 | Dixon | 404/16 |
| 4,521,129 | 6/1985 | Krech et al. | 404/10 |
| 4,555,161 | 11/1985 | Rowland . | |
| 4,557,624 | 12/1985 | Walker | 404/14 |
| 4,797,024 | 1/1989 | Forrer | 264/1.9 |
| 4,801,193 | 1/1989 | Martin . | |
| 4,842,784 | 6/1989 | Takahashi | 264/1.9 |
| 5,132,841 | 7/1992 | Bennett et al. | 359/529 |
| 5,171,624 | 12/1992 | Walter | 428/156 |
| 5,229,882 | 7/1993 | Rowland | 359/530 |
| 5,264,063 | 11/1993 | Martin | 156/247 |
| 5,327,850 | 7/1994 | Sly et al. | 116/63 R |
| 5,340,231 | 8/1994 | Steere et al. | 404/14 |
| 5,392,728 | 2/1995 | Speer et al. | 116/63 R |

METHOD FOR FORMING A RETROREFLECTIVE STRUCTURE

This application is a division of U.S. patent application Ser. No. 08/336,467, filed Nov. 9, 1994 and which issued as U.S. Pat. No. 5,501,545 on Mar. 26, 1996, which is incorporated herein by reference in its entirety.

BACKGROUND OF THE INVENTION

Road markers with retroreflective material make road markings visible for oncoming vehicles under nighttime conditions as a result of their ability to retroreflect light from the headlights of the vehicles. Road markers are mounted on the surface of a pavement, such as the center line, to define lanes for traffic. Markers are typically mounted on the road in a spaced relationship for guiding traffic. Retroreflective road markers are useful because such markers show up brighter and last longer than conventional glass bead-filled highway paint strips. An example of a retroreflective road marker is disclosed in U.S. patent application Ser. No. 08/092,708, filed Jul. 15, 1993 by Peter A. Spear et al., now U.S. Pat. No. 5,393,728, issued on Feb. 28, 1995.

With perfect retroreflective materials, light rays are reflected essentially towards a light source in a substantially parallel path along an axis of retroreflectivity. However, perfect retroreflectivity is not necessary for many applications. Instead, a balance is necessary between a cone of divergence which provides a degree of divergence which allows enough divergent light to strike the viewer's eye while not having the intensity of the reflected light at the viewer's eye unduly diminished. Where the only source of illumination is the headlights of an automobile on an unlit road, the ability to retroreflect a cone of divergence to the eye of the driver is important for safety reasons.

One type of retroreflective material is an array of cube-corner or prismatic retroreflectors that are described in U.S. Pat. No. 3,712,706, issued to Stamm (Jan. 23, 1973). Generally, the prisms are made by forming a master negative die on a flat surface of a metal plate or other suitable material. To form the cube-corners, three series of parallel, normally equidistance intersecting V-shaped grooves sixty degrees apart are inscribed in the flat plate. The geometry so generated is of a positive configuration. A die of a negative configuration is then produced, usually by electroforming, which is then used to process the desired cube-corner array into a flat plastic surface.

When the groove angle is 70 degrees, 31 minutes, 43.6 seconds, the angle formed by the intersection of two cube faces (the dihedral angle) is 90 degrees and the incident light is reflected back to the source. On a retroreflector used in traffic applications, the dihedral angle is often changed so that the incidental light coming from an automobile headlight is retroreflected into a cone of light which encompasses the driver's eyes.

Further details concerning the structures and operation of cube-corner microprisms can be found in U.S. Pat. No. 3,684,348, issued to Rowland (Aug. 15, 1972), and a method for making retroreflective sheeting is also disclosed in U.S. Pat. No. 3,689,346, issued to Rowland (Sep. 5, 1972), the teachings of which are incorporated by reference herein. The disclosed method is for forming cube-corner microprisms in a cooperatively configured mold. The prisms are bonded to sheeting which is applied thereover to provide a composite structure in which the cube-corner formations project from one surface of the sheeting.

The efficiency of a retroreflective structure is a measure of the amount of incidental light returned within a cone diverging from the axis of retroreflection. Distortion of the prismatic structure adversely effects the efficiency. Furthermore, cube-corner retroreflective elements have low angularity, i.e., the element will only brightly retroreflect light that impinges on it within a narrow angular range centering approximately on its optical axis. Low angularity arises by the inherent nature of these elements, which are trihedral structures having three mutually perpendicular lateral faces. The elements are arranged so that light to be retroreflected impinges into the internal space defined by the faces, and retroreflection of the impinging light occurs by internal reflection of the light from face to face of the element. Impinging light that is inclined substantially away from the optical axis of the element (which is the trisector of the internal space defined by the faces of the element) strikes a face at an angle less than its critical angle, thereby passing through the face rather than being reflected. This is often a problem with road markers because a high profile is necessary for retroreflection of light while a low profile is necessary to avoid damage to automobile tires.

Therefore, a need exists for a retroreflective structure that can effectively retroreflect impinging light while having a low profile.

SUMMARY OF THE INVENTION

The present invention relates to a retroreflective structure that has a window side and a facet side. The facet side includes a stepped structure having arrays of retroreflective elements on the risers of the structure. Preferably, the arrays are cube-corner prisms that have a metalized surface.

The present invention also relates to a method for forming the retroreflective structure. The structure is formed by polymerizing or molding a composition in a mold that has a facet side that is tiered with steps and risers. The risers have arrays of retroreflective elements, which, preferably, are cube-corner prisms. The arrays can be coated with a metalized coating.

The present invention also includes a road marker with a retroreflective structure that is attached. The road marker has a raised rumple portion of which the portion projects upwardly from the base of the structure. The rumple portion has at least one concave surface for attaching the structure. The structure has a window side and facet side. The facet side is tiered with steps and risers. The risers have an array of retroreflective elements, which can be cube-corner prisms.

The present invention has many advantages that include allowing a substantial amount of incidental light striking a low angle to the surface of a structure to be retroreflected. The structure can be applied a surface of a road marker having a surface with a low profile to allow automobiles to drive over the road marker while allowing incidental light from a distant automobile to be retroreflected.

DETAILED DESCRIPTION OF THE INVENTION

The features and other details of the method and apparatus of the invention will now be more particularly described with reference to the accompanying drawings and pointed out in the claims. The same numeral presented in different figures represents the same item. It will be understood that the particular embodiments of the invention are shown by way of illustration and not as limitations of the invention. The principal features of this invention can be employed in various embodiments without departing from the scope of the invention.

Figure 1:
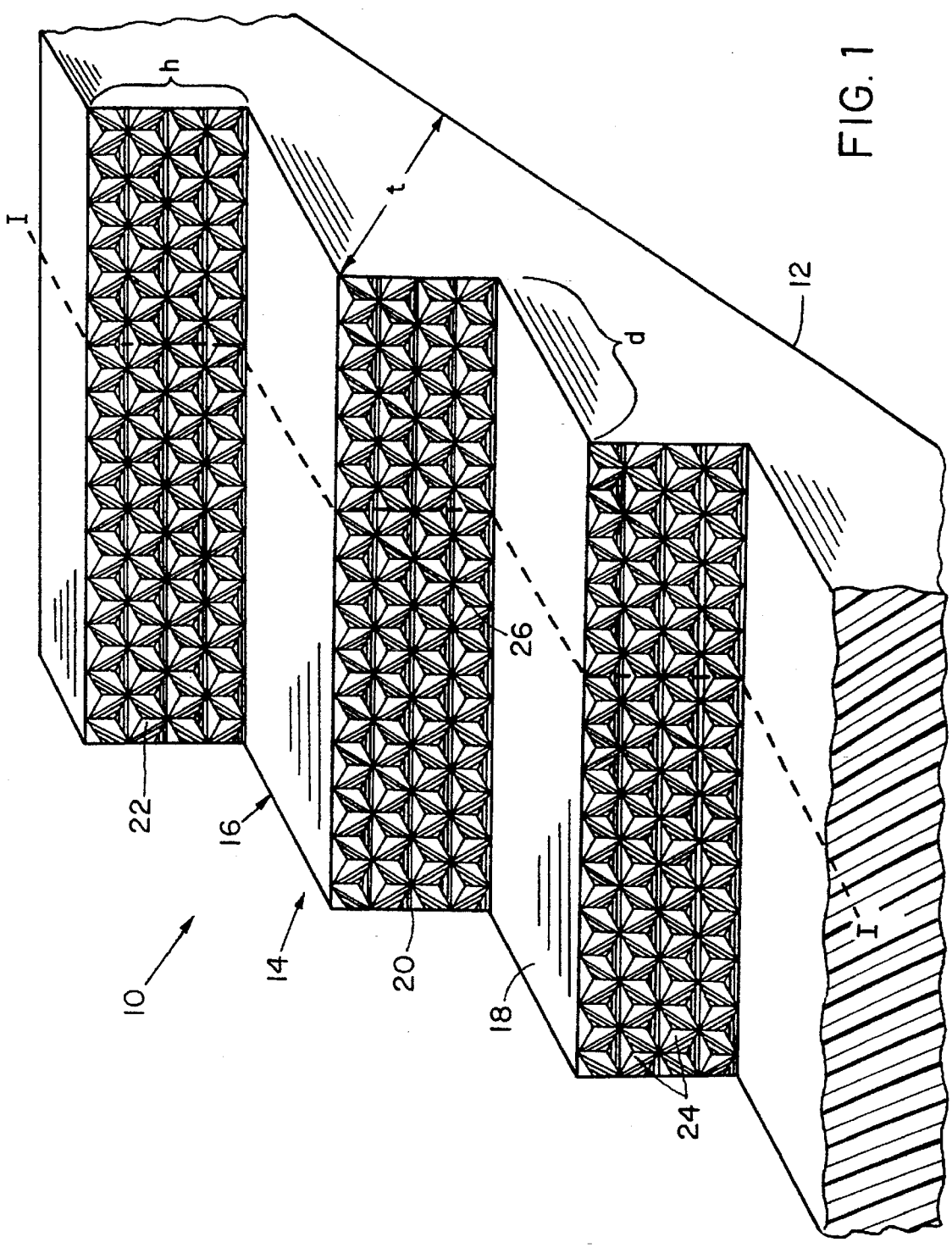
FIG. 1 is a perspective view of a retroreflective structure of the present invention.

One embodiment of the invention, as shown in FIG. 1 in a perspective view, is a portion of retroreflective structure 10. Retroreflective structure 10 has window side 12 and facet side 14. Window side 12 can be a flat surface. Facet side 14 has a tiered structure 16 formed of a tread portion 18 and a riser portion 20 extending at an angle to the tread portion 18. The face of the riser portion 20 is formed into an array 22 of retroreflective elements 24. Array 22 can be comprised of cube-corner prism elements, bar prisms elements, frensel lens elements, etc. In a preferred embodiment, each riser portion 20 has four rows of cube-corner prisms elements 24 with a cube-side length 26 in the range of between about 0.004 and 0.02 inches.

Retroreflected light intensity off a surface is typically greatest at the optical axis which is where the angle of incidence of the light source to the surface is ninety degrees. Therefore, light received by an array of elements has the greatest retroreflectivity where the elements are positioned in a manner to allow the light to be retroreflected at ninety degrees to the array.

Figure 2:
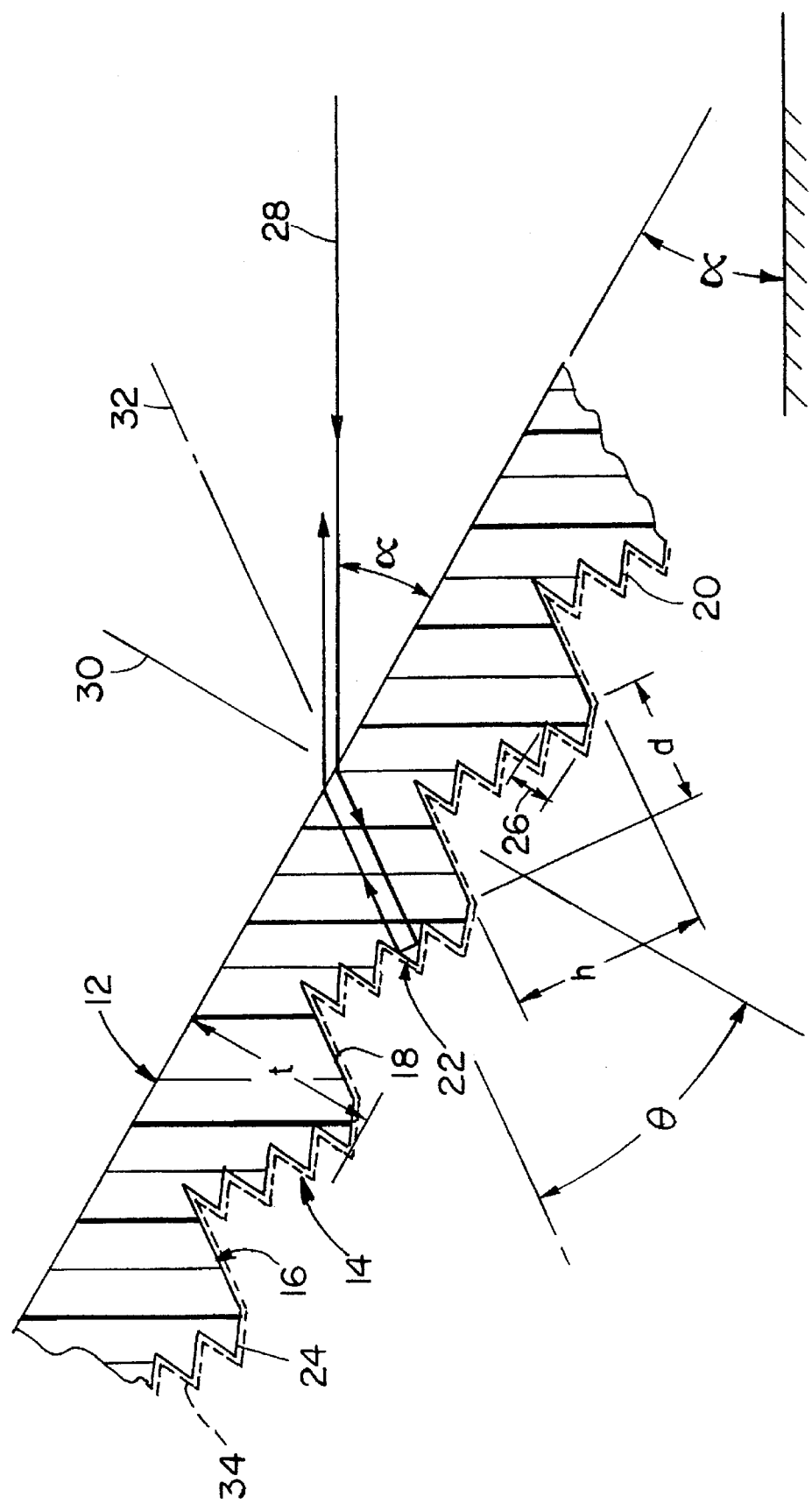
FIG. 2 is a cross-sectional view of the first embodiment of the retroreflective structure of the present invention.

A cross-sectional view of a portion of retroreflective structure 10 taken along lines I—I of FIG. 1 is shown in FIG. 2. Tread portion 18 has a depth (d) which is the distance from the back of an array of elements on one level to the back of an array of elements on the next level. The riser height (h) is the distance from the level of one tread portion 18 to the next tread portion 18. The ratio of riser height (h) to tread depth (d) is dependent on the index of refraction of the material selected for array 22 and the angle $\alpha$ at which light that is to be retroreflected is incident to the surface of window side 12. The retroreflective structure can be attached to a road marker at angle $\alpha$ between the road pavement and window side surface 12 for retroreflecting the light received from headlights. Often the size of angle $\alpha$ is about 30° in relation to the road pavement. Further, depending on the index of refraction, light ray 28 from a source, such as from a distance automobile, is bent as it passes through the air/surface interface to an angle $\theta$ from the normal 30 to the surface of window side 12. The arrays 22 of retroreflective elements are positioned perpendicularly to the optical axis 32 of light passing through retroreflective structure 10. For example, if retroreflective structure 10 is comprised of a polymer having an index of refraction of about 1.49, the light ray 28 would be bent to an angle of about 35.4° from the normal 30 if angle $\alpha$ is 30°. The depth of tread portion 18 can be calculated by the Equation 1, which has the formula:

$$\tan \theta = \text{depth of tread portion/height of riser portion} \quad (i)$$

If the angle of the light that is refracted through the flat window side 12 and height of the riser portion 20 having the arrays are known, the depth of tread portion can be calculated using Equation 1.

Riser portions 20 can be parallel with each other. Alternatively, retroreflective structure 10 can be arced slightly, thereby having riser portions 20 not parallel to allow for changes in angle $\alpha$ of light ray 24, such as with an approaching automobile, so that the refracted light rays are parallel to the optical axis of a substantial number of the retroreflective elements. In a preferred embodiment, the depth of tread portion 18 is in the range of between about 0.002 and 0.03 inches, and the height of riser portion 20 is in the same range of between about 0.002 and 0.03 inches.

Preferably, retroreflective structure 10 is formed of a polymer that can recover substantially its original shape after a deforming force has been removed. Such a polymer can be elastomeric or rigid. For instance, the polymer is sufficiently resilient to recover to its original configuration after having been compressed. Preferably, the polymer is transparent to visible light and is composed of a polymer, such as polyurethane, polyisobutylene, polybutadiene, polyvinyl chloride or polyvinylidene chloride. Alternatively, the polymer can be a copolymer or terpolymer, such as poly (ethylene-propylene), poly(styrene-butadiene), poly(vinyl acetate-vinyl chloride) and poly(ethylene-vinyl acetate). Also the polymer can be selected from a wide variety of polymers that are considered rigid. These polymers include the polymers of urethane, acrylic acid esters, cellulose esters, ethylenically unsaturated nitriles, hard epoxy acrylates, etc. Other polymers include polycarbonates, polyesters and polyolefins, acrylated silanes, hard polyester urethane acrylates. Preferably, the polymer can be cast in a prismatic mold with a monomer or oligomer polymerization initiated by ultraviolet radiation. Also, retroreflective structure 10 can be formed of a composition having an index of refraction in the range of between about 1.49 and 1.56.

Retroreflective structure 10 can have a thickness (t), shown in FIG. 2, in the range of between about 0.5 and 30 mils (0.0005 and 0.03 inches). In a preferred embodiment, the thickness is in the range of between about 1 and 10 mils (0.001 and 0.01 inches). The selected thickness is dependent upon the method of fabrication, the polymer and the characteristics desired for the retroreflective structure.

A mold for forming the retroreflective structure 10 can be formed from a master negative die on a flat surface of a metal plate or other suitable material. In one embodiment, the mold is formed of a polycarbonate polymer. To form the cube-corners, three series of parallel equidistance intersecting V-shaped grooves sixty degrees apart are inscribed in a flat plate, creating a positive configuration. Another flat plate of negative configuration, usually made by electroforming is then cut in parallel slits, thereby forming a series of parallel plates that can be offset to form a plurality of tiers which are stepped, wherein the face of each riser has the array of retroreflective elements. The retroreflective structure can be cast from the die. Alternatively, individual sheets of metal can be formed having a thickness of about the height of the face. A structure for forming retroreflective elements is inscribed on one side edge of each sheet. The sheets are then placed in parallel and the arrays are offset by the desired depth of the tread portions 20.

The retroreflective structure 10 can be attached to a surface by an adhesive or only at certain points on the surface, such as in a grid pattern, thereby allowing an air interface to remain. Alternatively, the retroreflective structure 10 can be attached by high frequency welding. In a preferred embodiment, the lines of the grid are spaced about a one half inch or one inch apart and have a width in the range of between about a sixteenth to one eighth of an inch.

If an adhesive is employed on the prism elements, the adhesive can cause the surface of the prisms elements to wet, thereby destroying the air interface and eliminating the ability of the prism to retroreflect. As a result, reflective coating 34 is preferably deposited on the surface of the retroreflective elements. Typically, the reflective coating 34 is formed by sputtering aluminum, silver or gold or by vacuum metallization. Alternatively, metal lacquers, dielectric coatings and other specular coating materials can be employed.

Figure 3:
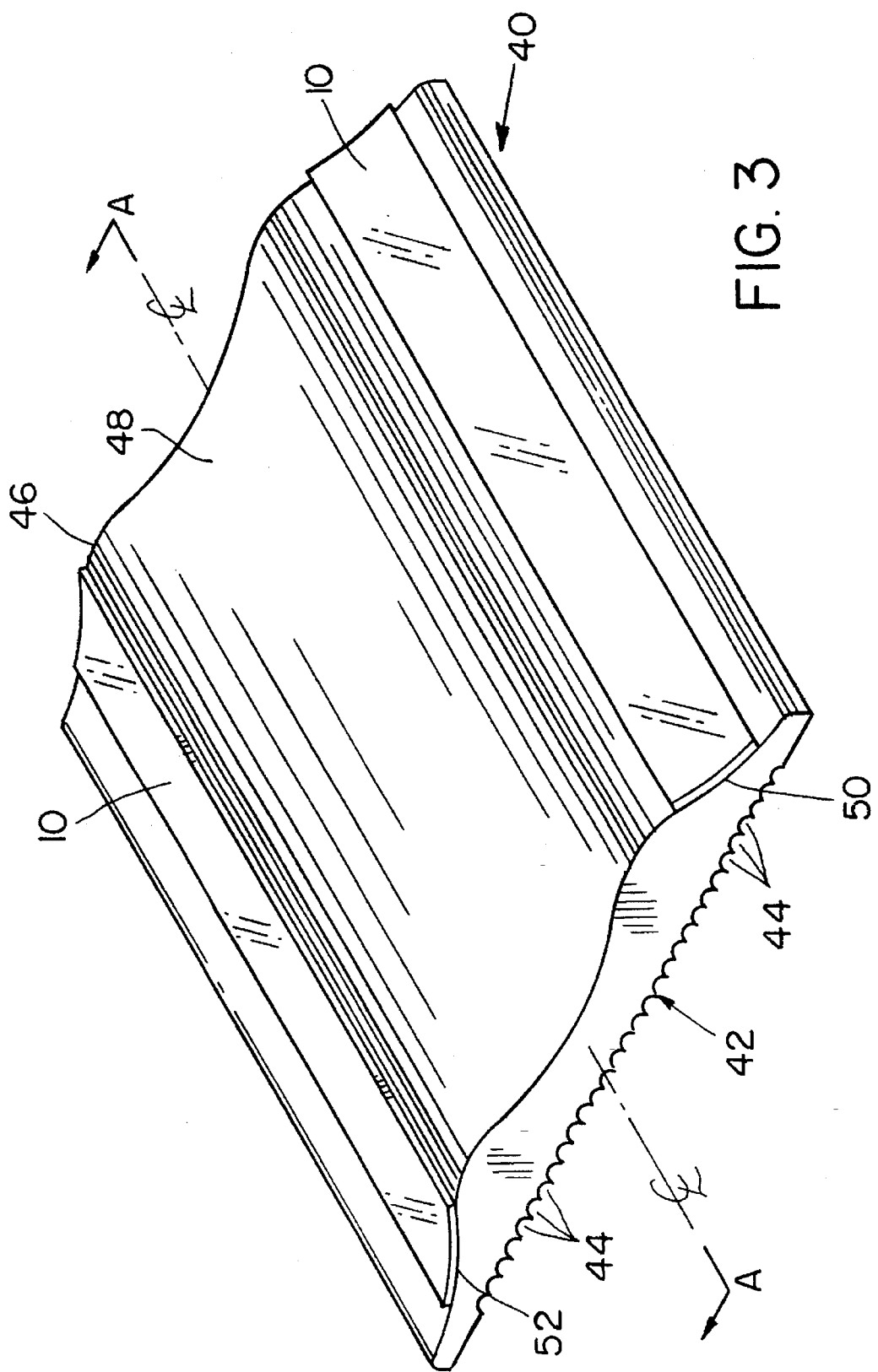
FIG. 3 is a perspective view of a road marker having the retroreflective structure of the present invention.
Figure 4:
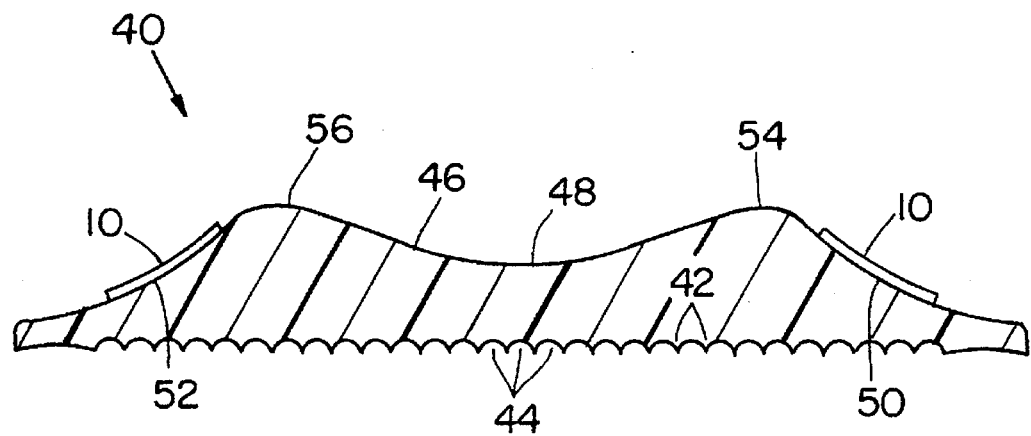
FIG. 4 is a cross-sectional view of the road marker and retroreflective structure shown in FIG. 5.

FIGS. 3 and 4 illustrate the general shape of a preferred embodiment of a road marker 40 for use with the present invention. The body of the road marker is disclosed in U.S. patent application Ser. No. 08/092,708, filed Jul. 15, 1993, applicants Peter A. Spear et al., now U.S. Pat. No. 5,393,728, issued on Feb. 28, 1995, the teachings of which are herein incorporated by reference. The road marker 40 has a constant cross section from one end to the other along a longitudinal center line A—A. The constant cross section allows the illustrated road marker 40 to be extruded using conventional nonmetallic, i.e., plastic, extrusion technology, and sheared to any desired length. Road marker 40, which is illustrated in FIG. 3, includes a base 42 and raised rumple portion 46. The bottom of the base 42 is substantially planar and of rectangular shape. A large bottom allows a road marker to be strongly attached to a road surface by any suitable adhesive, such as epoxy, butyl, or hot melt bituminous adhesive.

The bottom of the base 42 can include a series of parallel grooves 44. Grooves 44 are disposed adjacent and parallel to one another. Grooves 44 also lie parallel to the longitudinal center line A—A. Grooves 44 extend the entire length of the marker 40 and have an arcuate cross section. When compared to a base with a flat bottom, the arcuate cross section increases the size of the adhesion surface of the bottom, thereby allowing the base to be better attached to a roadway. Arcuate grooves have even a larger surface area than do the V-shaped grooves, thereby providing better road attachment.

The raised rumple portion 46 is comprised of two regions, a center scalloped recess 48 and concave curved edges 50, 52. Because the concave curved edges can be identical, the road marker 40 can be positioned such that either edge can form the traffic facing edge when the marker is used on a road with traffic moving in a single direction, or both edges can form traffic facing edges when the marker is used on a road with traffic coming from opposite directions.

The center scalloped recess and the concave curved edges cause the raised rumple portion 46 to have the cross-sectional shape of a pair of humps 54, 56. The humps are located between the centered scalloped recess 48 and the curved edges 50, 52. The cross-sectional shape is constant throughout the length of the road marker 40 along centerline A—A. Because the primary function of the scalloped recess 48 is to reduce the weight of the road marker 40, the exact shape of this recess is not critical. While shown as curved, the scalloped recess 48 could have some other form. One important aspect of the scalloped recess 48 is its average radius of curvature. In this regard, although the exact specifications of the curvature are not critical, the average radius of curvature of the scalloped recess 48 should be substantially less than the radius of curvature of smaller-sized automobile tires. Since smaller-sized automobile tires have a radius of curvature of about thirteen inches, this means that the average radius of curvature of the scalloped recess 48 should be substantially less than thirteen inches. An average radius of curvature substantially less than the radius of curvature of smaller-sized automobile tires prevents automobile and other vehicle tires from seating in the recess 48 when a tire passes over the road marker 40.

Reflective structure 10 is added to the surfaces of the concave curved edges 50, 52 of a road marker. More specifically, the embodiments of the invention shown in FIGS. 3 and 4 include a retroreflective structure 10 applied to and held in place with the surfaces of the concave curved edges 50, 52. The facet side 14 of retroreflective structure 10 is attached atop the surface of the concave curved edges 50, 52 by a suitable adhesive, the angle α of the window side 12 of retroreflective structure 10 to the pavement is sufficient to allow the light rays from a distance automobile to bend enough so that it can be parallel to the optical axis of the array of retroreflective elements.

Figure 5:
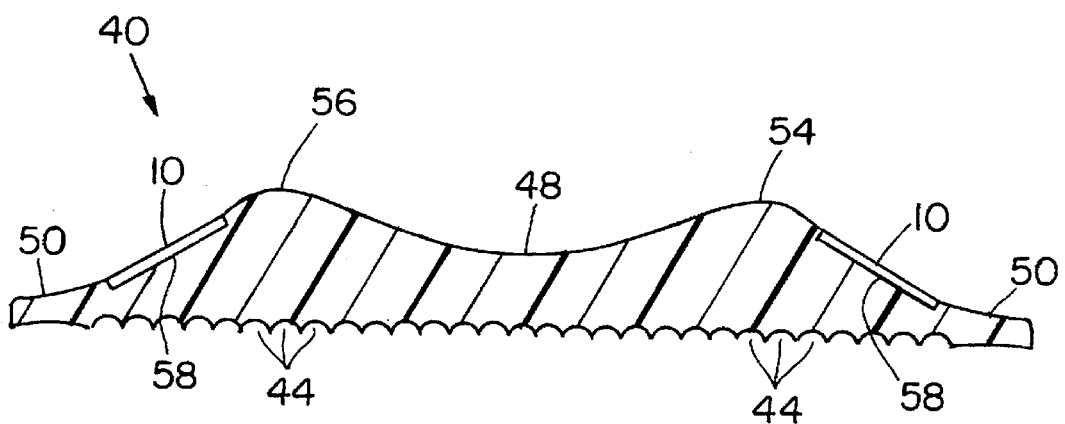
FIG. 5 is a cross-sectional view of another embodiment of the road marker and retroreflective marker.

FIG. 5 illustrates that the concave curved edges 50, 52 can include an undercut region 60 for receiving the retroreflective structure 10. Placing the retroreflective structure 10 in undercut region 58 provides additional protection against tire abrasion.

The radius of curvature of the concave curved edge 50 of the road marker 40 is such that when a tire impacts the hump 54 that occurs where the end of the concave curved edge 50 meets the scalloped recess 48, the tire does not impact the surface of the concave curved edge 50. As a result, the tire does not ride on the surface of the concave curved edge 50 and, thus, does not impinge on retroreflective structure 10 located on the surface of the concave curved edge 50. In essence, the retroreflective structure 10 lies in a gap between the surface of the concave curved edge 50 and the surface of tires impacting road marker 40. Consequently, most tires impacting road marker 40 will not apply friction to retroreflective structure 10 and, thus, will not contribute to the destruction or removal of retroreflective structure 10 either located directly on the surface of concave curved edge 50, as shown in FIGS. 3 and 4, or located in undercut region 58 of the concave curved edge, as shown in FIG. 5.

Figure 6:
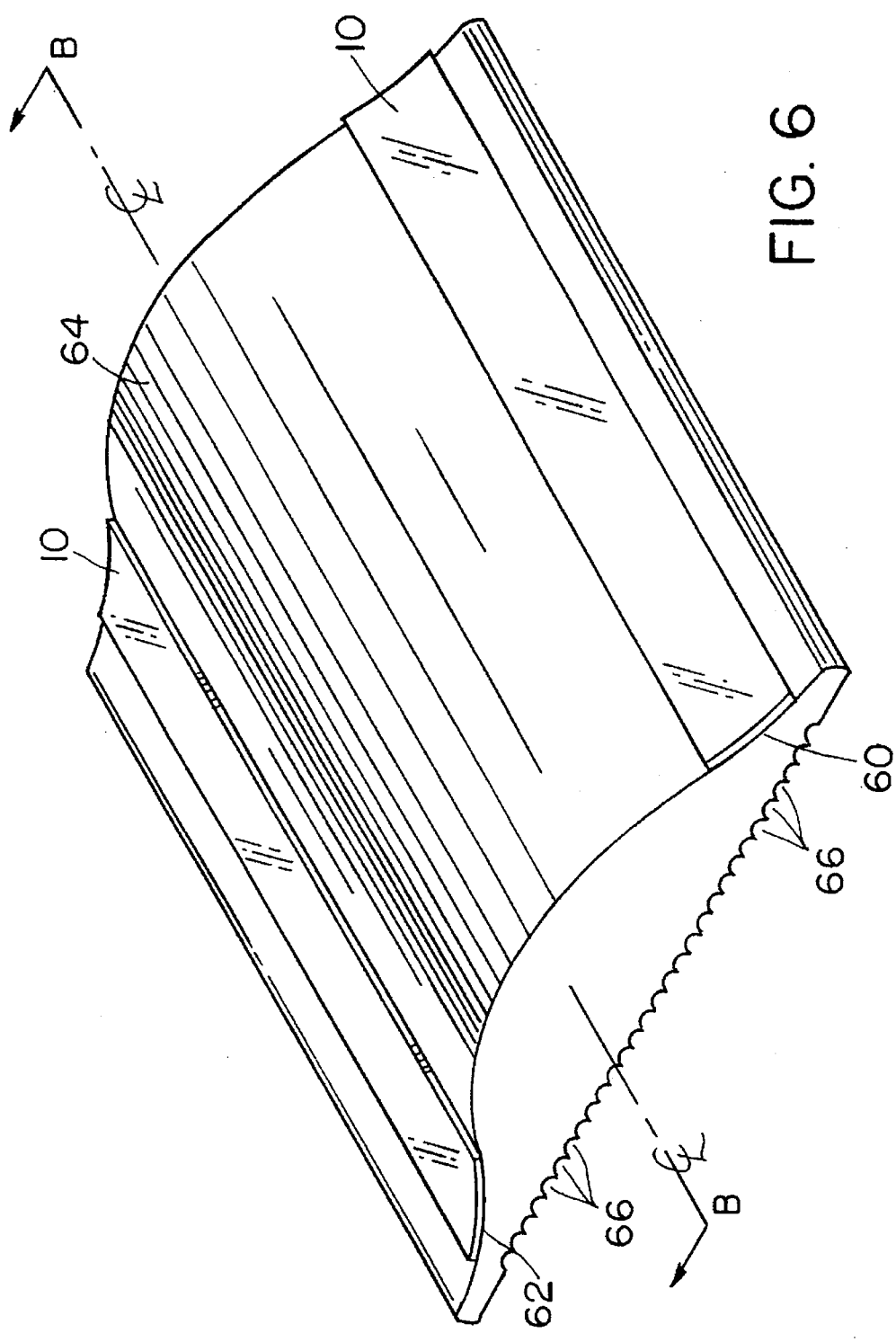
FIG. 6 is a perspective view of another embodiment of a road marker and retroreflective structure.

FIG. 6 illustrates yet another embodiment of a road marker with retroreflective structure 10. Rather than the raised rumple portion including a scalloped recess located between concave curved edges 60, 62, a convex protrusion 64 is located therebetween. As with the other embodiments, the road marker is constant along its longitudinal axis B—B and the concave curved edges 60, 62 have a constant or variable radius of curvature sized such that tires hitting the concave curved edges do not apply friction to strips of retroreflective structure 10 applied to the concave curved edges. The convex protrusion 64 rises upwardly between the concave curved edges 60, 62. The radius of curvature of the convex protrusion lies in the range of between about two and ten inches, with about 3.5 inches being preferred. The base of the marker illustrated in FIG. 6 is similar to the base of the previously described markers. For example, the base includes a plurality of parallel grooves 66.

Preferably, the illustrated road markers are formed with a constant cross section. This allows such embodiments to be manufactured by extrusion. The illustrated embodiments can be formed by extruding a suitable plastic through a die having a shape corresponding to the desired cross-sectional configuration. The extrudate is then cured and hardened. The manufacture of road markers using an extrusion method greatly decreases the cost of such markers. Moreover, extrusion allows road markers performed in accordance with the present invention to be easily manufactured in varying length. This allows the embodiments of the invention to be used as "rumple" strips, as well as spaced-apart road markers. The continuous nature of the base allows less adhesive to be used to create a strong bond between the base of the roadway marker and a road surface. While, preferably, the embodiments of the are made by extrusion, embodiments of the invention can be molded, if desired. Damaged and/or eroded retroreflective structure can be replaced, provided the bodies of markers formed in accordance with the invention remain intact, making embodiments of the invention reusable and, thus, more economical.

Equivalents

Those skilled in the art will recognize, or be able to ascertain using no more than routine experimentation, many equivalents to the specific embodiments of the invention described specifically herein. Such equivalents are intended to be encompassed in the scope of the claims.

What is claimed is:

1. A method for forming a retroreflective structure, comprising the steps of:
   a) forming a master negative die for forming an array of retroreflective prism elements on a flat surface of a plate;
   b) cutting the plate in parallel slits, thereby forming a series of parallel plates that can be offset to form a plurality of tiers, said tiers being stepped with treads and risers, wherein the face of each riser has the array of retroreflective prism elements;
   c) offsetting the parallel plates to form a mold of the tiered structure; and
   d) polymerizing a polymerizable material in the mold having a facet side comprising the tiered structure having a plurality of steps with treads and risers intersecting at an angle and wherein said risers comprise the array of retroreflective prism elements to form the retroreflective structure.

2. The method of claim 1 wherein the polymerized material is transparent.

3. The method of claim 2 wherein the polymerized material is selected from the group consisting of polyurethane, polyisobutylene, polybutadiene, polyvinyl chloride, polyvinylidene chloride, epoxy polyacrylate, polynitrile, polycarbonate and polyester.

4. The method of claim 3 wherein a metalized reflective layer is applied to the facet side of said retroreflective structure.

5. The method of claim 4 wherein the metalized retroreflective layer is a metal selected from the group consisting of aluminum, silver and gold.

6. A method for forming a retroreflective structure to retroreflective light incident along an optical axis comprising polymerizing a polymerizable material in a mold, wherein, said mold includes (i) a planar window side for facing the incident light and which surface is adapted to be disposed on a road marker at an angle α to a road surface; and (ii) a facet side opposite the window side comprising a tiered structure having a plurality of steps with tread surfaces and riser surfaces intersecting at an angle and wherein said riser surfaces comprise an array for forming retroreflective prism elements in the riser surfaces and disposed therein such that light incident at said angle α to the plane of the window side of the retroreflective structure is retroreflected by said prism elements, and wherein α is less than 90° and greater than 0°, thereby forming the retroreflective structure.

7. The method of claim 6 wherein the prism elements each have a base from which retroreflective side walls extend and meet at an apex.

8. The method of claim 7 wherein the tread surfaces extend a distance d from the base of a prism element in one tier surface to the base of a prism element in a next adjacent tier surface, wherein d equals tan θ divided by the height of a riser surface, and wherein θ is an angle formed between a normal to the plane of the planar window side and an optical axis of the prism elements.

9. The method of claim 6 wherein α is about 30° and said risers are parallel with each other.

10. The method of claim 9 wherein the height of the riser surfaces and the depth of the tread surfaces are both in the range of between about 0.002 and 0.03 inches.

11. The method of claim 7 wherein said structure is formed of transparent composition.

12. The method of claim 6 wherein the tiered structure is formed of composition having an index of refraction in the range of between about 1.49 and 1.56.

13. The method of claim 6 wherein said structure is formed of a material selected from the group consisting of polyurethane, polyisobutylene, polybutadiene, polyvinyl chloride, polyvinylidene chloride, epoxy polyacrylate, polynitrile, polycarbonate and polyester.

14. The method of claim 7 wherein a reflective layer is formed on the side walls of said formed structure.

15. The method of claim 14 wherein the reflective layer is formed of a material selected from the group consisting of metals and dielectrics.

16. The method of claim 15 wherein said prism elements are formed with a cube-side length in the range of between about 0.004 and 0.02 inches.

17. A method for forming a road marker having a retroreflective structure, comprising the steps of:
   a) forming a base for attachment to a road surface, wherein said base has a substantially rectangular shape;
   b) forming a raised rumple portion, wherein said portion projects upwardly from said base and is defined by at least one edge which includes a concave curved surface; and
   c) attaching a retroreflective structure on said road marker at said raised rumple portion, wherein said structure includes a planar window side which is disposed at an angle α to said road surface and a facet side opposite the window side, wherein said facet side comprises a tiered structure having a plurality of steps with tread surfaces and riser surfaces intersecting at an angle and wherein said riser surfaces comprise an array of retroreflective prism elements formed in the riser surfaces and wherein light incident at an angle α to the plane of the window side is retroreflected by said prism elements, thereby forming the road marker having a retroreflective structure.

18. The method of claim 17 wherein α is about 30° and said retroreflective structure is embedded in said raised rumple portion.

19. The method of claim 17 wherein the prism elements each have a base from which retroreflective side walls extend to an apex.

20. The method of claim 17 wherein the tread surfaces extend a distance d from the base of a prism element in one tier surface to the base of a prism element in a next adjacent tier surface; and d equals tan θ divided by the height of a riser surface and wherein θ is an angle formed between a normal to the plane of the planar window side and an optical axis of the prism elements.

* * * * *